United States Patent
Oka et al.

(10) Patent No.: US 11,230,633 B2
(45) Date of Patent: Jan. 25, 2022

(54) RESIN COMPOSITION, CURED PRODUCT AND LAMINATE

(71) Applicant: DIC Corporation, Tokyo (JP)

(72) Inventors: Kenichirou Oka, Sakura (JP); Hideki Torii, Sakura (JP); Yasuhiro Takada, Sakura (JP)

(73) Assignee: DIC Corporation, Tokyo (JP)

( * ) Notice: Subject to any disclaimer, the term of this patent is extended or adjusted under 35 U.S.C. 154(b) by 77 days.

(21) Appl. No.: 16/754,922

(22) PCT Filed: Nov. 20, 2018

(86) PCT No.: PCT/JP2018/042785
§ 371 (c)(1),
(2) Date: Apr. 9, 2020

(87) PCT Pub. No.: WO2019/123942
PCT Pub. Date: Jun. 27, 2019

(65) Prior Publication Data
US 2020/0263002 A1   Aug. 20, 2020

(30) Foreign Application Priority Data

Dec. 19, 2017 (JP) .............................. JP2017-242791
Apr. 16, 2018 (JP) .............................. JP2018-078374

(51) Int. Cl.
*C08K 5/3492* (2006.01)
*C09D 7/48* (2018.01)
*C09D 133/14* (2006.01)

(52) U.S. Cl.
CPC .............. *C08K 5/3492* (2013.01); *C09D 7/48* (2018.01); *C09D 133/14* (2013.01)

(58) Field of Classification Search
CPC ....... C08K 5/3492; C09D 133/14; C09D 7/48
USPC .......................................................... 524/720
See application file for complete search history.

(56) References Cited

U.S. PATENT DOCUMENTS

| 6,306,502 B1 | 10/2001 | Fukushima et al. |
| 2015/0044477 A1* | 2/2015 | Takashima |

FOREIGN PATENT DOCUMENTS

| JP | 3747065 B2 | 2/2006 |
| JP | 4204106 B2 | 1/2009 |
| JP | 2010-111810 A | 5/2010 |
| JP | 2010111810 A * | 5/2010 |

OTHER PUBLICATIONS

Translation of JP 2010-111810 (patents application 2008-286698, May 20, 2010. (Year: 2010).*
International Search Report dated Feb. 19, 2019, issued for PCT/JP2018/042785.

* cited by examiner

Primary Examiner — Hui H Chin
(74) Attorney, Agent, or Firm — Locke Lord LLP

(57) ABSTRACT

The present invention discloses a resin composition containing an isocyanurate ring-containing urethane (meth)acrylate compound A, an isocyanurate ring-containing tri(meth)acrylate compound B, and a triazine ultraviolet light absorber C, wherein the isocyanurate ring-containing urethane (meth)acrylate compound A contains a compound A-1 having a specific structure, and the isocyanurate ring-containing tri(meth)acrylate compound B contains a compound B-1 having a specific structure.

13 Claims, No Drawings

RESIN COMPOSITION, CURED PRODUCT AND LAMINATE

TECHNICAL FIELD

The present invention relates to a resin composition containing a specific isocyanurate ring-containing (meth)acrylate compound and a triazine ultraviolet light absorber.

BACKGROUND ART

Transparent resin materials, such as polycarbonate, have features that they have a small specific gravity and are lightweight, and that they can be easily processed and have a resistance to impact, and therefore are widely used in various applications, such as resin glass. On the other hand, the resin materials have problems to be solved in that the surface of the resin material is easily damaged and hence the luster or transparency of the material easily becomes poor, in that the resin material is poor in solvent resistance, weathering resistance, heat resistance, and the like. For this reason, the resin material is generally used in the form of a resin which is coated with a certain type of a protective film for the purpose of improving the surface properties.

Particularly, the resin materials to be used outdoors are required to have both excellent abrasion resistance and excellent weathering resistance. For example, PTL 1 discloses, as a coating agent having both abrasion resistance and weathering resistance, an abrasion-resistant coating forming composition which contains an ultraviolet curing silicone and an urethane poly(meth)acrylate having a specific isocyanurate and alicyclic skeleton, and PTL 2 discloses a coating composition which contains a pentaerythritol poly(meth)acrylate having a specific structure, an urethane (poly)methacrylate having a polymerizable unsaturated double bond, and a poly[(meth)acryloyloxyalkyl] (iso)cyanurate. However, these compositions do not satisfy the performance of weathering resistance, and there is demanded a method for achieving a resin composition which exhibits weathering resistance for a longer term.

CITATION LIST

Patent Literature

PTL 1: Japanese Patent No. 3747065
PTL 2: Japanese Patent No. 4204106

SUMMARY OF INVENTION

Technical Problem

An object of the present invention is to obtain a resin composition from which a cured product having excellent long-term weathering resistance can be obtained.

Solution to Problem

The present inventors have conducted extensive and intensive studies. As a result, it has been found that the above-mentioned object can be achieved by providing a resin composition which contains an isocyanurate ring-containing urethane (meth)acrylate compound having a specific structure, an isocyanurate ring-containing tri(meth)acrylate compound having a specific structure, and a triazine ultraviolet light absorber.

Specifically, the present invention is a resin composition which contains an isocyanurate ring-containing urethane (meth)acrylate compound A, an isocyanurate ring-containing tri(meth)acrylate compound B, and a triazine ultraviolet light absorber C, wherein the isocyanurate ring-containing urethane (meth)acrylate compound A contains a compound A-1 represented by the formula (1), and the isocyanurate ring-containing tri(meth)acrylate compound B contains a compound B-1 represented by the formula (2):

[Chem. 1]

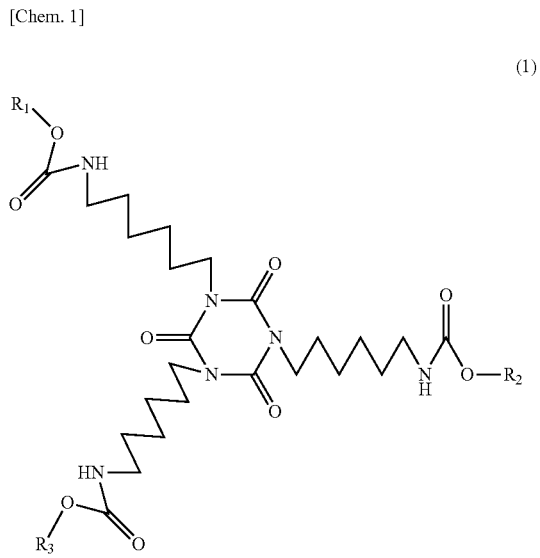

(1)

wherein, in the formula (1), each of $R_1$, $R_2$, and $R_3$ independently represents a group represented by the formula (1-a) or formula (1-b):

[Chem. 2]

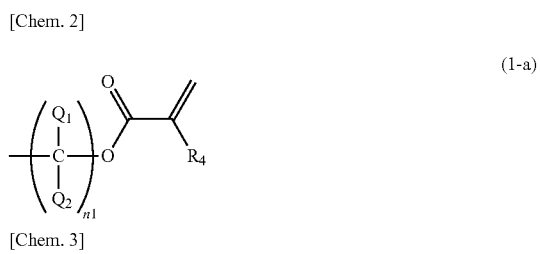

(1-a)

[Chem. 3]

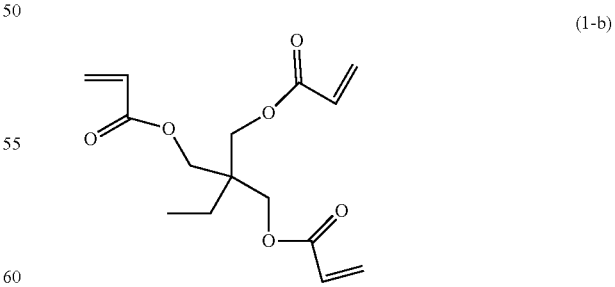

(1-b)

wherein, in the formula (1-a), n1 represents an integer of 2 to 4, $R_4$ represents a hydrogen atom or a methyl group, and each of $Q_1$ and $Q_2$ independently represents a hydrogen atom or an alkyl group having 1 to 5 carbon atoms in the repeating unit, and at least one of $Q_1$ and $Q_2$ is an alkyl group,

[Chem. 4]

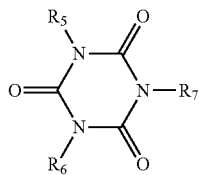
(2)

wherein, in the formula (2), each of $R_5$, $R_6$, and $R_7$ independently represents a group represented by the following formula (2-a):

[Chem. 5]

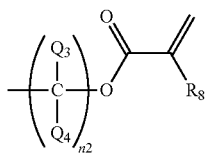
(2-a)

wherein, in the formula (2-a), n2 represents an integer of 2 to 4, $R_8$ represents a hydrogen atom or a methyl group, and each of $Q_3$ and $Q_4$ independently represents a hydrogen atom or an alkyl group having 1 to 5 carbon atoms in the repeating unit.

Further, the present invention provides the resin composition wherein the isocyanurate ring-containing urethane (meth)acrylate compound A further contains a compound A-2 represented by the following formula (3):

[Chem. 6]

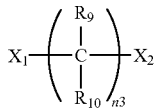
(3)

wherein, in the formula (3), n3 represents an integer of 2 to 9, each of $R_9$ and $R_{10}$ independently represents a hydrogen atom or an alkyl group having 1 to 7 carbon atoms in the repeating unit, and each of $X_1$ and $X_2$ independently represents a group represented by the following formula (3-a):

[Chem. 7]

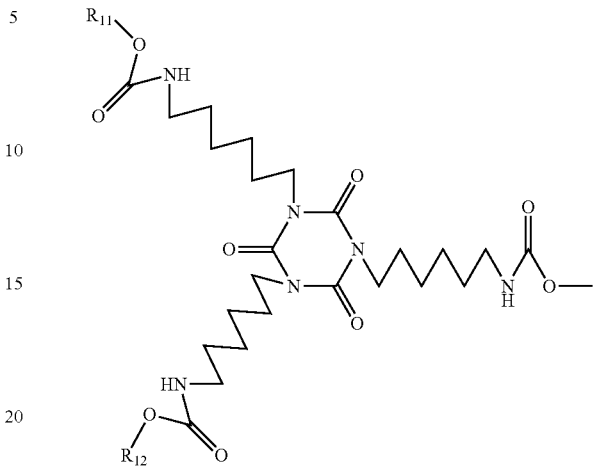
(3-a)

wherein, in the formula (3-a), each of $R_{11}$ and $R_{12}$ independently represents a group represented by the formula (1-a) or formula (1-b) above.

Further, the present invention provides the resin composition wherein the isocyanurate ring-containing urethane (meth)acrylate compound A has at least one structure represented by the formula (1-b).

Advantageous Effects of Invention

The composition of the present invention is advantageous in that a cured product having excellent abrasion resistance and excellent weathering resistance, particularly long-term weathering resistance can be obtained from the composition, and therefore a molded article having excellent hard coat properties can be produced from the composition. The composition of the present invention also has excellent adhesion to a substrate, particularly a plastic substrate, and therefore can be advantageously used as a coating agent for a plastic. Particularly, the composition can be advantageously used as a hard coat in outdoor applications.

DESCRIPTION OF EMBODIMENTS

The resin composition contains an isocyanurate ring-containing urethane (meth)acrylate compound A, an isocyanurate ring-containing tri(meth)acrylate compound B, and a triazine ultraviolet light absorber C, wherein the isocyanurate ring-containing urethane (meth)acrylate compound A contains a compound A-1 represented by the formula (1), and the isocyanurate ring-containing tri(meth)acrylate compound B contains a compound B-1 represented by the formula (2).

The incorporation of an ultraviolet light absorber is effective in improving the weathering resistance of the resin cured product. Particularly, a triazine ultraviolet light absorber is known to have high ultraviolet light absorption ability. However, a compound having a triazine skeleton generally has low compatibility, and therefore it has been difficult to uniformly blend the triazine ultraviolet light absorber into a composition. Further, when a compatibilizing component, a solvent, or the like is blended in order to compatibilize the triazine ultraviolet light absorber, the ultraviolet light absorber becomes compatible with the composition, but there is a danger that the triazine ultraviolet light absorber and compatibilizing component bleed out of the resultant cured product due to heating or deposition of water, an oil, or the like on the cured product.

In the composition of the present invention, the compound A-1 is present in the isocyanurate ring-containing urethane (meth)acrylate compound A, and therefore both compatibility of the triazine ultraviolet light absorber and bleed resistance can be achieved. The reason for this is as follows. The crosslinking density of the cured product is increased due to the compound A-1, which is a polyfunctional (meth)acrylate having three or more (meth)acryloyl groups, and the rigidity of the isocyanurate ring, so that the ultraviolet light absorber is unlikely to bleed out of the cured product. A branched alkyl group is present in the linking group between (a)an (meth)acryloyl group and an urethane linkage, that is, at least one of $Q_1$ and $Q_2$ in the structure of the formula (1-a) is an alkyl group, and thus the compatibility of the ultraviolet light absorber is improved.

In addition, the compound A-2 is further present in the isocyanurate ring-containing urethane (meth)acrylate compound A in the present invention, and therefore the compatibility of the triazine ultraviolet light absorber is improved. The reason is that the long-chain alkyl of the compound A-2 improves the compatibility of the triazine ultraviolet light absorber.

Further, it is preferred that the isocyanurate ring-containing urethane (meth)acrylate compound A in the present invention has at least one structure represented by the formula (1-b). In this case, the crosslinking density of the cured product is improved, preventing the ultraviolet light absorber from bleeding out of the cured product.

Further, the isocyanurate ring and urethane linkage contained in the composition of the present invention contribute to weathering resistance, particularly crack resistance, making it possible to obtain a cured product having excellent weathering resistance.

Furthermore, the isocyanurate ring-containing tri(meth)acrylate compound B having no urethane skeleton improves the adhesion to a substrate, particularly a plastic substrate.

<Isocyanurate Ring-Containing Urethane (meth)acrylate Compound A>

The isocyanurate ring-containing urethane (meth)acrylate compound A in the present invention is of a structure having an isocyanurate ring structure, an urethane linkage, and (a)an (meth)acryloyl group.

<Compound A-1>

The isocyanurate ring-containing urethane (meth)acrylate compound A in the present invention contains a compound A-1 represented by the following formula (1):

[Chem. 8]

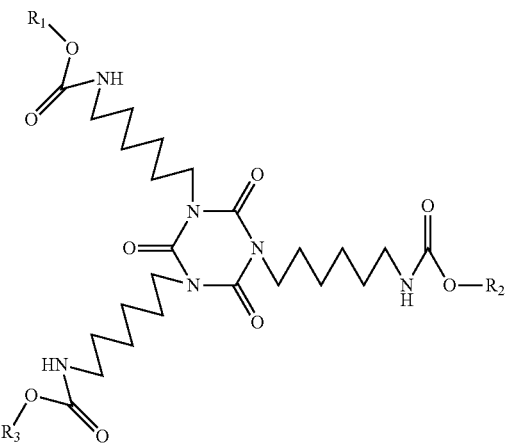

(1)

wherein, in the formula (1), each of $R_1$, $R_2$, and $R_3$ independently represents a group represented by the formula (1-a) or formula (1-b):

[Chem. 9]

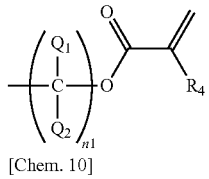

(1-a)

[Chem. 10]

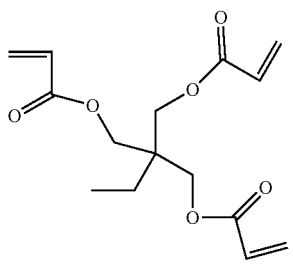

(1-b)

wherein, in the formula (1-a), n1 represents an integer of 2 to 4, $R_4$ represents a hydrogen atom or a methyl group, and each of $Q_1$ and $Q_2$ independently represents a hydrogen atom or an alkyl group having 1 to 5 carbon atoms in the repeating unit, and at least one of $Q_1$ and $Q_2$ is an alkyl group.

The compound A-1 in the present invention is a compound having, bonded to an isocyanurate ring structure through an urethane linkage, three or more groups having a polymerizable unsaturated group.

The compound A-1 in the present invention contains an alkyl component in a small amount, and has a polymerizable unsaturated group which is trifunctional or polyfunctional and has an isocyanurate ring, and therefore improves the crosslinking density upon being cured. This contributes to the suppression of bleeding and suppression of photodecomposition. Further, the improvement of the crosslinking density improves the abrasion resistance.

In addition, flexibility is imparted to the cured product due to the effects of the isocyanurate ring structure and the urethane structure, thus improving the crack resistance.

In the structure (1-a), each of $Q_1$ and $Q_2$ independently represents a hydrogen atom or an alkyl group having 1 to 5 carbon atoms in the repeating unit, and at least one of $Q_1$ and $Q_2$ is an alkyl group. This is because the alkyl group having a branched structure can improve the compatibility of the ultraviolet light absorber C.

As examples of the hydroxy-alkyl (meth)acrylate forming the structure (1-a) in the present invention, there can be mentioned the following structures.

Examples include 2-hydroxy-propyl (meth)acrylate, 2-hydroxy-1-methylethyl (meth)acrylate, 2-hydroxy-butyl (meth)acrylate, 1-ethyl-2-hydroxy-ethyl (meth)acrylate, 2-hydroxy-pentyl (meth)acrylate, 2-hydroxy-1-propylethyl (meth)acrylate, 3-hydroxy-butyl (meth)acrylate, 3-hydroxy-2-methylpropyl (meth)acrylate, 3-hydroxy-pentyl (meth) acrylate, 2-ethyl-3-hydroxy-propyl (meth)acrylate, 1-ethyl-3-hydroxy-propyl (meth)acrylate, 3-hydroxy-hexyl (meth) acrylate, 3-hydroxy-2-propylpropyl (meth)acrylate, 3-hydroxy-1-propylpropyl (meth)acrylate, 4-hydroxy-pentyl (meth)acrylate, 4-hydroxy-3-methylbutyl (meth)acrylate, 4-hydroxy-2-methylbutyl (meth)acrylate, 4-hydroxy-1-methylbutyl (meth)acrylate, 4-hydroxy-hexyl (meth)acrylate, 3-ethyl-4-hydroxy-butyl (meth)acrylate, 2-ethyl-4-hydroxy-butyl (meth)acrylate, 1-ethyl-4-hydroxy-butyl (meth) acrylate, 4-hydroxy-heptyl (meth)acrylate, 4-hydroxy-3-propylbutyl (meth)acrylate, 4-hydroxy-2-propylbutyl (meth)acrylate, and 4-hydroxy-1-propylbutyl (meth)acrylate.

More preferred examples include 2-hydroxy-propyl (meth)acrylate, 2-hydroxy-1-methylethyl (meth)acrylate, 3-hydroxy-butyl (meth)acrylate, 3-hydroxy-2-methylpropyl (meth)acrylate, 4-hydroxy-pentyl (meth)acrylate, 4-hydroxy-3-methylbutyl (meth)acrylate, 4-hydroxy-2-methylbutyl (meth)acrylate, and 4-hydroxy-1-methylbutyl (meth) acrylate.

As specific examples of structures of the compound A-1 in the present invention, there can be mentioned the following structures.

There can be mentioned compounds obtained by reacting an isocyanurate type trimer of 1,6-hexamethylene diisocyanate with 2-hydroxy-propyl (meth)acrylate, 2-hydroxy-1-methylethyl (meth)acrylate, 2-hydroxy-butyl (meth)acrylate, 1-ethyl-2-hydroxy-ethyl (meth)acrylate, 2-hydroxy-pentyl (meth)acrylate, 2-hydroxy-1-propylethyl (meth) acrylate, 3-hydroxy-butyl (meth)acrylate, 3-hydroxy-2-methylpropyl (meth)acrylate, 3-hydroxy-pentyl (meth) acrylate, 2-ethyl-3-hydroxy-propyl (meth)acrylate, 1-ethyl-3-hydroxy-propyl (meth)acrylate, 3-hydroxy-hexyl (meth) acrylate, 3-hydroxy-2-propylpropyl (meth)acrylate, 3-hydroxy-1-propylpropyl (meth)acrylate, 4-hydroxy-pentyl (meth)acrylate, 4-hydroxy-3-methylbutyl (meth)acrylate, 4-hydroxy-2-methylbutyl (meth)acrylate, 4-hydroxy-1-methylbutyl (meth)acrylate, 4-hydroxy-hexyl (meth)acrylate, 3-ethyl-4-hydroxy-butyl (meth)acrylate, 2-ethyl-4-hydroxy-butyl (meth)acrylate, 1-ethyl-4-hydroxy-butyl (meth) acrylate, 4-hydroxy-heptyl (meth)acrylate, 4-hydroxy-3-propylbutyl (meth)acrylate, 4-hydroxy-2-propylbutyl (meth)acrylate, or 4-hydroxy-1-propylbutyl (meth)acrylate.

More preferably, there can be mentioned compounds obtained by reacting a trimer of 1,6-hexane diisocyanate with 2-hydroxy-propyl (meth)acrylate, 2-hydroxy-1-methylethyl (meth)acrylate, 3-hydroxy-butyl (meth)acrylate, 3-hydroxy-2-methylpropyl (meth)acrylate, 4-hydroxy-pentyl (meth)acrylate, 4-hydroxy-3-methylbutyl (meth)acrylate, 4-hydroxy-2-methylbutyl (meth)acrylate, or 4-hydroxy-1-methylbutyl (meth)acrylate.

<Compound A-2>

The isocyanurate ring-containing urethane (meth)acrylate compound A in the present invention may contain a compound A-2 represented by the following formula (3):

[Chem. 11]

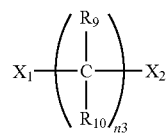

(3)

wherein, in the formula (3), n3 represents an integer of 2 to 9, each of $R_9$ and $R_{10}$ independently represents a hydrogen atom or an alkyl group having 1 to 7 carbon atoms in the repeating unit, and each of $X_1$ and $X_2$ independently represents a group represented by the following formula (3-a):

[Chem. 12]

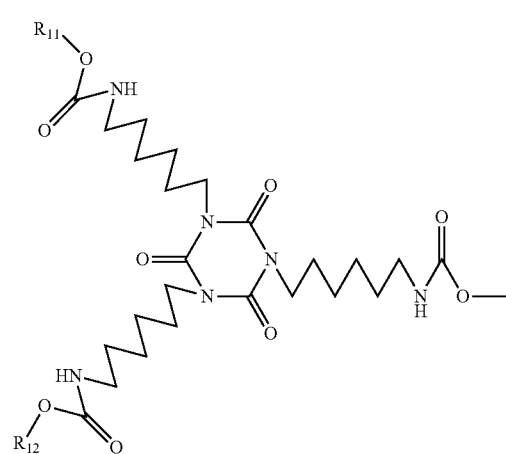

(3-a)

wherein, in the formula (3-a), each of $R_{11}$ and $R_{12}$ independently represents a group represented by the formula (1-a) or formula (1-b) above.

The compound A-2 in the present invention is a compound having bonded thereto the isocyanurate ring structure (3-a) having an alkyl group through an alkylene group having 2 to 9 carbon atoms. Preferred examples of alkyl groups having 2 to 9 carbon atoms include a methylene group, an ethylene group, a propylene group, a butylene group, a pentylene group, a hexylene group, an octyl group, and a nonylene. Preferred are those having 2 to 6 carbon atoms.

Further, each of $R_9$ and $R_{10}$ is independently a hydrogen atom or an alkyl group having 1 to 7 carbon atoms, preferably an alkyl group having 1 to 6 carbon atoms.

The compound A-2 in the present invention has an isocyanurate ring-containing structure represented by the formula (3-a) at both ends of the structure represented by the formula (3). The isocyanurate ring-containing structure represented by the formula (3-a) is a structure having at an end a polymerizable unsaturated group represented by the formula (1-a) or formula (1-b) above, and therefore the compound A-2 is a polymerizable compound.

The compound A-2 in the present invention preferably has a structure having a linear structure and a branched structure, such as the formulae (4) to (8).

[Chem. 13]

Formula (4)

In the formula (4), n4 represents an integer of 2 to 9.

[Chem. 14]

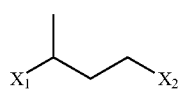
Formula (5)

[Chem. 15]

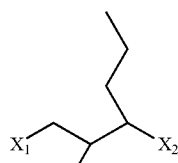
Formula (6)

[Chem. 16]

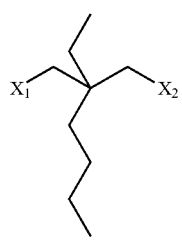
Formula (7)

[Chem. 17]

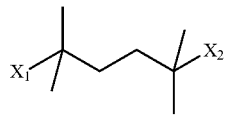
Formula (8)

The compound A-2 more preferably has a structure having a branched structure, such as the formulae (5) to (8).

With respect to the diol compound forming the compound A-2 in the present invention, there can be mentioned a linear saturated alkyldiol and a branched saturated alkyldiol compound, which are composed only of carbon and hydrogen.

Examples of linear saturated alkyldiols include diol compounds, such as ethylene glycol, 1,3-propanediol, 1,4-butylenediol, 1,6-hexanediol, 1,8-octanediol, and 1,9-nonanediol.

Examples of branched saturated alkyldiols include diol compounds, such as 1,2-propanediol, 1,3-butanediol, 3-methylpentanediol, 2,5-hexanediol, 2,5-dimethyl-2,5-hexanediol, 2,4-dimethyl-2,4-pentanediol, 2,4-diethyl-1,5-pentanediol, 2,4-pentanediol, 2-ethyl-1,3-hexanediol, 2-butyl-2-ethyl-1,3-propanediol, and 2,4-diethyl-1,5-pentanediol.

With respect to the diol compound forming the compound A-2 in the present invention, as examples of especially preferred structures, there can be mentioned branched saturated alkyldiol compounds, and, of these, preferred are diol compounds, such as 1,2-propanediol, 1,3-butanediol, 3-methylpentanediol, 2,5-hexanediol, 2,5-dimethyl-2,5-hexanediol, 2,4-dimethyl-2,4-pentanediol, 2,4-diethyl-1,5-pentanediol, 2,4-pentanediol, 2-ethyl-1,3-hexanediol, 2-butyl-2-ethyl-1,3-propanediol, and 2,4-diethyl-1,5-pentanediol.

The compound A-2 in the present invention has a long-chain alkyl group, and therefore is able to cause the triazine ultraviolet light absorber C having high ultraviolet light absorption effect to be compatible with the compound. In addition, flexibility is imparted to the cured product due to the effects of the isocyanurate ring structure, urethane structure, and long-chain alkyl group, thus improving the crack resistance.

It is preferred that the isocyanurate ring-containing urethane (meth)acrylate compound A in the present invention has a pentaerythritol triacrylate structure represented by the formula (1-b) below. This is because, by virtue of the compound having such a structure, the crosslinking density of the cured product is increased, making it possible to prevent the ultraviolet light absorber C from bleeding out of the cured product.

[Chem. 18]

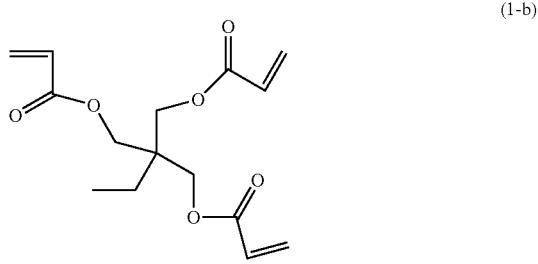
(1-b)

The isocyanurate ring-containing urethane (meth)acrylate compound A has the structure of the formula (1-b), and the compound A-1 may have the structure of the formula (1-b), or the compound A-2 may have the structure of the formula (1-b).

It is preferred that the isocyanurate ring-containing urethane (meth)acrylate compound A has one or two structures of the formula (1-b) for one isocyanurate ring structure of the compound A.

<Compound A-1 and Compound A-2>

It is preferred that the compound A-1 and the compound A-2 in the present invention are incorporated so that, relative to 100 parts by weight of the total of the solids of the compounds having (meth)acrylate and the filler contained in the resin composition, the total amount of the isocyanurate ring-containing urethane (meth)acrylate compound A is 5 to 95 parts by weight and the compound A-1:compound A-2 molar ratio is 100:0 to 10:90. It is more preferred that the compound A-1 and the compound A-2 are incorporated so that the total amount of the isocyanurate ring-containing urethane (meth)acrylate compound A is 10 to 90 parts by weight and the compound A-1:compound A-2 molar ratio is 100:0 to 10:90. It is further preferred that the compound A-1 and the compound A-2 are incorporated so that the total amount of the isocyanurate ring-containing urethane (meth) acrylate compound A is 20 to 80 parts by weight and the compound A-11:compound A-2 molar ratio is 95:5 to 20:80.

<Isocyanurate Ring-Containing tri(meth)acrylate Compound B>

The isocyanurate ring-containing tri(meth)acrylate compound B in the present invention is represented by the following formula (2):

[Chem. 19]

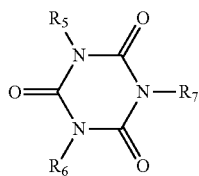

(2)

wherein, in the formula (2), each of $R_5$, $R_6$, and $R_7$ independently represents a group represented by the following formula (2-a):

[Chem. 20]

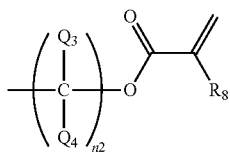

(2-a)

wherein, in the formula (2-a), n2 represents an integer of 2 to 4, $R_8$ represents a hydrogen atom or a methyl group, and each of $Q_3$ and $Q_4$ independently represents a hydrogen atom or an alkyl group having 1 to 5 carbon atoms in the repeating unit.

Further, each of $Q_3$ and $Q_4$ independently represents a hydrogen atom or an alkyl group having 1 to 5 carbon atoms in the repeating unit, and preferably represents a hydrogen atom.

As a preferred structure of the isocyanurate ring-containing tri(meth)acrylate compound B, there can be mentioned the structure shown below.

[Chem. 21]

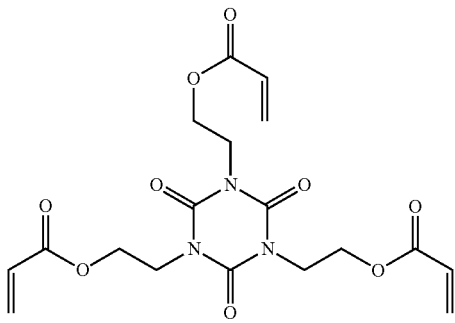

The amount of the compound B is preferably 5 to 95 parts by weight, relative to 100 parts by weight of the total of the solids of the compounds having (meth)acrylate and the filler contained in the resin composition. When the amount of the compound B is in the above-mentioned range, the adhesion to a substrate is improved while maintaining the effects of the present invention. The amount of the compound B is preferably 10 to 90 parts by weight, further preferably 20 to 80 parts by weight.

<Triazine Ultraviolet Light Absorber C>

The resin composition of the present invention contains a triazine ultraviolet light absorber C. The triazine ultraviolet light absorber means an ultraviolet light absorber having a triazine skeleton, and examples include 2-[4-[(2-hydroxy-3-dodecyloxypropyl)oxy]-2-hydroxy-phenyl]-4,6-bis(2,4-dimethylphenyl)-1,3,5-triazine, 2-[4-[(2-hydroxy-3-tridecyloxypropyl)oxy]-2-hydroxy-phenyl]-4,6-bis(2,4-dimethylphenyl)-1,3,5-triazine, 2-[4-[(2-hydroxy-3-(2-ethyl-hexyloxy)propyl)oxy]-2-hydroxy-phenyl]-4,6-bis(2,4-dimethylphenyl)-1,3,5-triazine, 2,4-bis(2-hydroxy-4-butyloxyphenyl)-6-(2,4-bis-butyloxyphenyl)-1,3,5-triazine, and 2-(2-hydroxy-4-[1-octyloxycarbonylethoxy]phenyl)-4,6-bis(4-phenylphenyl)-1,3,5-triazine, and preferred examples include a reaction product of 2-(4,6-bis(2,4-dimethylphenyl)-1,3,5-triazin-2-yl)-5-hydroxy-phenyl and oxirane [(C10-C16, mainly C12-C13 alkyloxy)methyl]oxirane, a reaction product of 2-(2,4-dihydroxy-phenyl)-4,6-bis-(2,4-dimethylphenyl)-1,3,5-triazine and (2-ethyl-hexyl)-glycidic ester, 2,4-bis[2-hydroxy-4-butoxyphenyl]-6-(2,4-dibutoxyphenyl)-1,3,5-triazine, and 2-(2-hydroxy-4-[1-octyloxycarbonylethoxy]phenyl)-4,6-bis(4-phenylphenyl)-1,3,5-triazine. As a commercially available triazine ultraviolet light absorber, there can be used TINUVIN 400 (manufactured by BASF AG), TINUVIN 405 (manufactured by BASF AG), TINUVIN 460 (manufactured by BASF AG), TINUVIN 477 (manufactured by BASF AG), TINUVIN 479 (manufactured by BASF AG), ADK STAB LA-46 (ADEKA Corporation), and ADK STAB LA-F70.

The triazine ultraviolet light absorber C is preferably incorporated in an amount of 2 to 15 parts by weight, relative to 100 parts by weight of the total of the solids of the compounds having (meth)acrylate and the filler contained in the resin composition. When the amount of the triazine ultraviolet light absorber C is 2 parts by weight or more, the ultraviolet light absorption ability is satisfactorily exhibited, and, when the amount of the triazine ultraviolet light absorber C is 15 parts by weight or less, it is unlikely that the ultraviolet light absorber bleeds out of the cured product. The amount of the triazine ultraviolet light absorber C is preferably 3 to 13 parts by weight, further preferably 4 to 9 parts by weight.

<Other Ingredients>

The composition of the present invention may contain another ingredient. For example, various resins, a reactive compound, a catalyst, a polymerization initiator, an organic filler, an inorganic filler, an organic solvent, an inorganic pigment, an organic pigment, a loading pigment, a clay mineral, a wax, a surfactant, a stabilizer, a fluidity control agent, a coupling agent, a dye, a leveling agent, a rheology control agent, an ultraviolet light absorber, an antioxidant, or a plasticizer may be incorporated.

As a reactive compound, (a)an (meth)acrylate compound other than the isocyanurate ring-containing urethane (meth)acrylate compound A and the isocyanurate ring-containing tri(meth)acrylate compound B, or a compound having a double bond, such as a vinyl group, may be incorporated into the composition. Examples of (meth)acryloyl compounds include monofunctional (meth)acrylates and polyfunctional (meth)acrylates.

Examples of monofunctional (meth)acrylates include hydroxyethyl (meth)acrylate, hydroxypropyl (meth)acrylate, hydroxybutyl (meth)acrylate, caprolactone-modified hydroxy (meth)acrylate (for example, trade name "Placcel", manufactured by Daicel Corporation), mono(meth)acrylate of polyester diol obtained from phthalic acid and propylene glycol, mono(meth)acrylate of polyester diol obtained from succinic acid and propylene glycol, polyethylene glycol mono(meth)acrylate, polypropylene glycol mono(meth) acrylate, 2-hydroxy-3-(meth)acryloyloxypropyl (meth)acrylate, and (meth)acrylic acid addition products of various epoxy esters.

Examples of polyfunctional (meth)acrylates include 1,4-butanediol di(meth)acrylate, 1,6-hexanediol di(meth)acrylate, 1,9-nonanediol di(meth)acrylate, neopentyl glycol di(meth)acrylate, glycerol tri(meth)acrylate modified with ethylene oxide, glycerol tri(meth)acrylate modified with propylene oxide, trimethylolpropane tri(meth)acrylate, hydroxypivalic acid-modified trimethylolpropane tri(meth) acrylate, trimethylolpropane tri(meth)acrylate modified with ethylene oxide, trimethylolpropane tri(meth)acrylate modified with propylene oxide, phosphate tri(meth)acrylate modified with ethylene oxide, pentaerythritol ethoxy tetra (meth)acrylate, pentaerythritol tri(meth)acrylate, dipentaerythritol tri(meth)acrylate, dipentaerythritol tetra(meth) acrylate, dipentaerythritol penta(meth)acrylate, dipentaerythritol hexa(meth)acrylate, tripentaerythritol tetra (meth)acrylate, tripentaerythritol penta(meth)acrylate, tripentaerythritol hexa(meth)acrylate, tripentaerythritol hepta (meth)acrylate, tripentaerythritol octa(meth)acrylate, dipentaerythritol hexa(meth)acrylate modified with ethylene oxide, dipentaerythritol hexa(meth)acrylate modified with propylene oxide, an urethane (meth)acrylate compound obtained by reacting an isocyanate compound and an alcohol compound, a polyester (meth)acrylate compound synthesized by a condensation reaction of a polyhydric alcohol, (meth)acrylic acid, and a polyfunctional carboxylic acid, and an epoxy (meth)acrylate compound synthesized by an addition reaction of a bisphenol epoxy resin or a novolak epoxy resin and (meth)acrylic acid.

Examples of organic solvents include ester solvents, ketone solvents, ether solvents, aliphatic solvents, aromatic solvents, and alcohol solvents.

Specifically, examples of ester solvents include ethyl acetate, propyl acetate, and butyl acetate, examples of ketone solvents include acetone, 2-butanone, methyl ethyl ketone, and methyl isobutyl ketone, examples of ether solvents include tetrahydrofuran and dioxolane, examples of aliphatic solvents include hexane and cyclohexane, examples of aromatic solvents include toluene and xylene, and examples of alcohol solvents include ethanol, methanol, propanol, butanol, and propylene glycol monomethyl ether.

Further, for controlling the viscosity, an organic polymer in a liquid state may be used. The organic polymer in a liquid state means an organic polymer in a liquid state, which does not directly participate in the curing reaction, and, for example, there can be mentioned a carboxyl group-containing polymer modification product (FLOWLEN G-900, NC-500: Kyoeisha Chemical Co., Ltd.), an acrylic polymer (FLOWLEN WK-20: Kyoeisha Chemical Co., Ltd.), an amine salt of a specially modified phosphate (HIPLAAD ED-251: Kusumoto Chemicals Ltd.), and a modified acrylic block copolymer (DISPERBYK 2000: BYK-Chemie).

With respect to various resins, a thermosetting resin or a thermoplastic resin can be used.

The thermosetting resin means a resin having properties that it can be changed to be substantially insoluble and infusible upon being cured by a means, such as heating, radiation, or a catalyst. A specific example of the thermosetting resin is a resin having properties that it can be changed to be substantially insoluble and infusible upon being cured by a means, such as heating, radiation, or a catalyst. Specific examples of thermosetting resins include a phenolic resin, a urea resin, a melamine resin, a benzoguanamine resin, an alkyd resin, an unsaturated polyester resin, a vinyl ester resin, a diallyl terephthalate resin, an epoxy resin, a silicone resin, an urethane resin, a furan resin, a ketone resin, a xylene resin, a thermosetting polyimide resin, a benzoxazine resin, an active ester resin, an aniline resin, a cyanate ester resin, and a styrene-maleic anhydride (SMA) resin. These thermosetting resins can be used individually or in combination.

The thermoplastic resin means a resin which can be melt-molded by heating. Specific examples of thermoplastic resins include a polyethylene resin, a polypropylene resin, a polystyrene resin, a rubber modified polystyrene resin, an acrylonitrile-butadiene-styrene (ABS) resin, an acrylonitrile-styrene (AS) resin, a polymethyl methacrylate resin, an acrylic resin, a polyvinyl chloride resin, a polyvinylidene chloride resin, a polyethylene terephthalate resin, an ethylene vinyl alcohol resin, a cellulose acetate resin, an ionomer resin, a polyacrylonitrile resin, a polyamide resin, a polyacetal resin, a polybutylene terephthalate resin, a polylactate resin, a polyphenylene ether resin, a modified polyphenylene ether resin, a polycarbonate resin, a polysulfone resin, a polyphenylene sulfide resin, a polyether imide resin, a polyether sulfone resin, a polyarylate resin, a thermoplastic polyimide resin, a polyamide-imide resin, a polyether ether ketone resin, a polyketone resin, a liquid crystalline polyester resin, a fluororesin, a syndiotactic polystyrene resin, and a cyclic polyolefin resin. These thermoplastic resins can be used individually or in combination.

A filler can be incorporated into the resin composition of the present invention. For example, for the purpose of improving the hard coat properties, silica can be incorporated into the resin composition.

With respect to the silica, there is no particular limitation, and known silica fine particles, such as silica in a powder form or colloidal silica, can be used. Examples of commercially available silica fine particles in a powder form include Aerosil 50, 200, manufactured by Nippon Aerosil Co., Ltd.; Sildex H31, H32, H51, H52, H121, H122, manufactured by Asahi Glass Co., Ltd.; E220A, E220, manufactured by Nippon Silica Industrial Co.; SYLYSIA 470, manufactured by Fuji Silysia Chemical Ltd.; and SG Flake, manufactured by Nippon Sheet Glass Co., Ltd. Further, examples of commercially available colloidal silica include methanol silica sol, IPA-ST, MEK-ST, PGM-ST, NBA-ST, XBA-ST, DMAC-ST, ST-UP, ST-OUP, ST-20, ST-40, ST-C, ST-N, ST-O, ST-50, ST-OL, manufactured by Nissan Chemical Industries, Ltd.

As the silica, reactive silica may be used. As an example of reactive silica, there can be mentioned reactive compound-modified silica. Examples of reactive compounds include a reactive silane coupling agent having a hydrophobic group, a compound having (a)an (meth)acryloyl group, a compound having a maleimide group, and a compound having a glycidyl group.

Examples of commercially available powder-form silica modified with a compound having (a)an (meth)acryloyl group include Aerosil RM50, R711, manufactured by Nippon Aerosil Co., Ltd., and examples of commercially available colloidal silica modified with a compound having (a)an meth)acryloyl group include MIBK-SD, MIBK-SD-L, MIBK-AC-2140Z, MEK-AC-2140Z, manufactured by Nissan Chemical Industries, Ltd. Further, examples of reactive silica include silica which is obtained by modifying it with a glycidyl group, and then subjecting the resultant silica to addition reaction of acrylic acid, such as 3-glycidoxypropyltrimethoxysilane, and silica which is modified with a product obtained by subjecting 3-isocyanatopropyltriethoxysilane and a compound having a hydroxyl group and (a)an (meth)acryloyl group to urethane forming reaction.

With respect to the shape of the silica fine particles, there is no particular limitation, and those in a spherical, hollow, porous, rod, plate, fibrous, or indefinite shape can be used. For example, as commercially available hollow silica fine particles, SiliNax, manufactured by Nittetsu Mining Co., Ltd., or the like can be used.

Further, the primary particle diameter of the silica fine particles is preferably in the range of 5 to 200 nm. When the primary particle diameter is 5 nm or more, dispersion of the inorganic fine particles in the composition becomes satisfactory, and, when the primary particle diameter is 200 nm or less, a satisfactory strength of the cured product can be maintained.

The amount of the silica incorporated is preferably 3 to 60 parts by weight, relative to 100 parts by weight of the total of the solids of the compounds having (meth)acrylate and the silica contained in the resin composition.

The resin composition of the present invention may have a filler other than silica. Examples of fillers other than silica include inorganic fillers and organic fillers. With respect to the form of the filler, there is no particular limitation, and examples include fillers in a particle form, a plate form, or in a fiber form.

For example, with respect to the inorganic fine particles, examples of those having excellent heat resistance include alumina, magnesia, titania, and zirconia; examples of those having excellent thermal conductivity include boron nitride, aluminum nitride, alumina oxide, titanium oxide, magnesium oxide, zinc oxide, and silicon oxide; examples of those having excellent electrical conductivity include a metallic filler and/or a metal-coated filler using a metal simple substance or alloy (for example, iron, copper, magnesium, aluminum, gold, silver, platinum, zinc, manganese, or stainless steel); examples of those having excellent barrier properties include minerals, such as mica, clay, kaolin, talc, zeolite, wollastonite, and smectite, potassium titanate, magnesium sulfate, sepiolite, xonotlite, aluminum borate, calcium carbonate, titanium oxide, barium sulfate, zinc oxide, and magnesium hydroxide; examples of those having a high refractive index include barium titanate, zirconia oxide, and titanium oxide; examples of those having photocatalytic properties include photocatalyst metals, such as titanium, cerium, zinc, copper, aluminum, tin, indium, phosphorus, carbon, sulfur, tellurium, nickel, iron, cobalt, silver, molybdenum, strontium, chromium, barium, and lead, composites of the above metals, and oxides thereof; examples of those having excellent abrasion resistance include metals, and composites and oxides thereof, such as alumina, zirconia, and magnesium oxide; examples of those having excellent electrical conductivity include metals, such as silver and copper, tin oxide, and indium oxide; and examples of those having excellent ultraviolet light screening properties include titanium oxide and zinc oxide.

These inorganic fine particles may be appropriately selected according to the application, and a single type of the inorganic fine particles may be used, or two or more types of the inorganic fine particles may be used in combination. Further, the inorganic fine particles have various properties other than the properties mentioned above, and therefore may be appropriately selected according to the application.

Examples of inorganic fibers include inorganic fibers, such as a carbon fiber, a glass fiber, a boron fiber, an alumina fiber, and a silicon carbide fiber, a carbon fiber, an activated carbon fiber, a graphite fiber, a glass fiber, a tungsten carbide fiber, a silicon carbide fiber, a ceramic fiber, an alumina fiber, natural fibers, mineral fibers, such as basalt, a boron fiber, a boron nitride fiber, a boron carbide fiber, and metallic fibers. Examples of the metallic fibers include an aluminum fiber, a copper fiber, a brass fiber, a stainless steel fiber, and a steel fiber.

Examples of organic fibers include synthetic fibers formed from a resin material, such as polybenzazole, aramid, PBO (polyparaphenylenebenzoxazole), polyphenylene sulfide, polyester, acryl, polyamide, polyolefin, polyvinyl alcohol, or polyarylate, natural fibers, such as cellulose, pulp, cotton, wool, and silk, and regenerated fibers, such as protein, polypeptide, and alginic acid.

The amount of the filler incorporated is preferably 3 to 60 parts by weight, relative to 100 parts by weight of the total of the solids of the compounds having (meth)acrylate and the filler contained in the resin composition.

The composition of the present invention is cured using an active energy ray, and therefore a polymerization initiator, particularly a photopolymerization initiator is preferably used. As the photopolymerization initiator, a known photopolymerization initiator may be used, and, for example, at least one member selected from the group consisting of an acetophenone, a benzylketal, and a benzophenone can be preferably used. Examples of the acetophenones include diethoxyacetophenone, 2-hydroxy-2-methyl-1-phenylpropan-1-one, 1-(4-isopropylphenyl)-2-hydroxy-2-methylpropan-1-one, and 4-(2-hydroxyethoxy)phenyl-(2-hydroxy-2-propyl) ketone. Examples of the benzylketals include 1-hydroxy-cyclohexyl-phenyl ketone and benzyldimethylketal. Examples of the benzophenones include benzophenone and methyl o-benzoylbenzoate. Examples of the benzoins include benzoin, benzoin methyl ether, and benzoin isopropyl ether. The photopolymerization initiators may be used individually or in combination. The amount of the photopolymerization initiator used is preferably 1 to 15% by weight, more preferably 2 to 10% by weight, based on the weight of the solids of the resin contained in the resin composition (100% by weight).

With respect to the ultraviolet light absorber, an ultraviolet light absorber other than the triazine ultraviolet light absorber C in the present invention can also be used. Examples of such ultraviolet light absorbers include ultraviolet light absorbers of a benzophenone, benzotriazole, cyclic iminoester, cyanoacrylate, or polymer type.

<Surface Modifier>

In the composition of the present invention, for the purpose of improving the leveling properties of the composition being applied, or improving the slip properties of the cured film so as to enhance the mar resistance, or the like, various surface modifiers may be added. With respect to the surface modifier, there can be used various types of commercially available additives for modifying the surface physical properties, which are called a surface control agent, a leveling agent, a slipperiness imparting agent, a stainproofness imparting agent, or the like. Of these, preferred are a silicone surface modifier and a fluorine surface modifier.

Specific examples of such surface modifiers include silicone polymers and oligomers each having a silicone chain and a polyalkylene oxide chain, silicone polymers and oligomers each having a silicone chain and a polyester chain, fluorine polymers and oligomers each having a perfluoroalkyl group and a polyalkylene oxide chain, and fluorine polymers and oligomers each having a perfluoroalkyl ether chain and a polyalkylene oxide chain. One or more members of these surface modifiers can be used. A surface modifier containing (a)an (meth)acryloyl group in the molecule thereof may be used for the purpose of improving the ability to maintain the slip properties, or the like. As specific examples of the surface modifiers, there can be mentioned EBECRYL 350 (DAICEL-ALLNEX LTD.), BYK-333 (BYK Japan KK), BYK-377 (BYK Japan KK), BYK-378 (BYK Japan KK), BYK-UV 3500 (BYK Japan KK), BYK-UV 3505 (BYK Japan KK), BYK-UV 3576 (BYK Japan KK), MEGAFACE RS-75 (DIC Corporation), MEGAFACE RS-76-E (DIC Corporation), MEGAFACE RS-72-K (DIC Corporation), MEGAFACE RS-76-NS (DIC Corporation), MEGAFACE RS-90 (DIC Corporation), MEGAFACE RS-91 (DIC Corporation), MEGAFACE RS-55 (DIC Corporation), OPTOOL DAC-HP (Daikin Industries, Ltd.), ZX-058-A (T&K TOKA Corporation), ZX-201 (T&K TOKA Corporation), ZX-202 (T&K TOKA Corporation), ZX-212 (T&K TOKA Corporation), ZX-214-A (T&K TOKA Corporation), X-22-164AS (Shin-Etsu Chemical Co., Ltd.), X-22-164A (Shin-Etsu Chemical Co., Ltd.), X-22-164B (Shin-Etsu Chemical Co., Ltd.), X-22-164C (Shin-Etsu Chemical Co., Ltd.), X-22-164E (Shin-Etsu Chemical Co., Ltd.), and X-22-174DX (Shin-Etsu Chemical Co., Ltd.).

<Laminate>

The laminate of the present invention can be obtained by laminating a substrate and a molded article of the resin composition of the present invention on one another. With respect to the material for the substrate, there is no particular limitation, and the material may be appropriately selected according to the use of the laminate, and, for example, there can be mentioned wood, a metal, a metal oxide, a plastic, paper, silicon, and modified silicon, and a substrate obtained by bonding different materials together may be used. With respect to the form of the substrate, there is no particular limitation, and the substrate may have an arbitrary form according to the purpose, such as a flat plate form, a sheet form, or a three-dimensional form having curvature in the entire surface or part thereof. Further, with respect to the hardness, thickness, and the like of the substrate, there is no particular limitation.

The laminate can be obtained by laminating the above-mentioned molded article on a substrate. The molded article to be laminated on a substrate may be formed by directly applying or directly molding the composition onto the substrate, and the molded article of the composition may be laminated on the substrate. When directly applying the composition onto the substrate, with respect to the method for application, there is no particular limitation, and examples of application methods include a spraying method, a spin coating method, a dipping method, a roll coating method, a blade coating method, a doctor roll method, a doctor blade method, a curtain coating method, a slit coating method, a screen printing method, and an ink-jet method. When directly molding the composition onto the substrate, examples of molding methods include in-mold molding, insert molding, vacuum molding, extrusion lamination, and press molding. When the molded article of the composition is laminated on the substrate, the lamination may be conducted in such a way that a layer of the uncured or semi-cured composition is laminated on the substrate and then cured, or in such a way that a layer of a cured product obtained by completely curing the composition is laminated on the substrate.

The resin composition of the present invention has high adhesion, particularly to a plastic substrate. With respect to the plastic substrate, there is no particular limitation as long as it is a resin, and, for example, the above-mentioned thermosetting resin or thermoplastic resin can be used. The substrate may be a substrate having a single type of resin or having two or more types of resins blended, and may be a substrate having a single layer or having a laminated structure of two or more layers. Further, the plastic substrate may be a fiber reinforced plastic (FRP).

When the laminate of the present invention is a transparent laminate, it is preferred that a plastic layer is formed from a polycarbonate resin (for example, an aliphatic polycarbonate, an aromatic polycarbonate, or an alicyclic polycarbonate), a polymethyl methacrylate resin, a polystyrene resin, or the like.

Further, the substrate may contain, if necessary, a known additive, such as a known antistatic agent, an anti-fogging agent, an anti-blocking agent, an ultraviolet light absorber, an antioxidant, a pigment, an organic filler, an inorganic filler, a light stabilizer, a nucleating agent, or a lubricant, in such an amount that the effects of the present invention are not sacrificed.

The laminate of the present invention may further have a second substrate on the substrate and the layer of the cured product of the present invention. With respect to the material for the second substrate, there is no particular limitation, and there can be mentioned wood, a metal, a metal oxide, a plastic, paper, silicon, and modified silicon, and a substrate obtained by bonding different materials together may be used. With respect to the form of the substrate, there is no particular limitation, and the substrate may have an arbitrary form according to the purpose, such as a flat plate form, a sheet form, or a three-dimensional form having curvature in the entire surface or part thereof. Further, with respect to the hardness, thickness and the like of the substrate, there is no particular limitation.

The laminate of the present invention has high adhesion to both a plastic and an inorganic material, and therefore can be preferably used as an interlayer material for different materials. In the especially preferred laminate, the substrate is a plastic and the second substrate is an inorganic layer. Examples of inorganic layers include quartz, sapphire, glass, an optical film, a ceramic material, an inorganic oxide, a vapor deposited film (CVD, PVD, or sputtered), a magnetic film, a reflective film, a metal, such as Ni, Cu, Cr, Fe, or stainless steel, paper, SOG (Spin On Glass), SOC (Spin On Carbon), a plastic layer, such as polyester, polycarbonate, or polyimide, a TFT array substrate, a PDP electrode plate, a conductive substrate, such as ITO or a metal, an insulating substrate, and a silicon substrate, such as silicon, silicon nitride, polysilicon, silicon oxide, or amorphous silicon.

(Curing)

The resin composition of the present invention contains the compound having a polymerizable unsaturated group, and hence can be cured by irradiation with an active energy ray.

The curing with an active energy ray means curing a coated material by irradiating the coated material with an active energy ray. As examples of active energy rays, there can be mentioned an ultraviolet light, an electron beam, and ionizing radiations, such as an α-ray, a β-ray, and a γ-ray. Of these, especially preferred is an ultraviolet (UV) light from the viewpoint of the curing properties and easy availability.

As a light used in curing with an ultraviolet light, for example, a low-pressure mercury lamp, a high-pressure mercury lamp, a metal halide lamp, a xenon lamp, an argon laser, a helium-cadmium laser, or the like can be used. By irradiating the applied surface of the coated material with an ultraviolet light having a wavelength of about 180 to 400 nm using the above lamp, the film can be cured to form a cured product layer, obtaining a laminate. The dose of an ultraviolet light is appropriately selected according to the type and amount of the photopolymerization initiator used.

(Use)

The laminate of the present invention has excellent hard coat properties and excellent weathering resistance, and therefore can be advantageously used especially as various types of protective materials. For example, the laminate can be used for building materials, for house facilities, for transport, such as automobiles, vessels, aircrafts, and railroads, for electronic materials, for recording materials, for optical materials, for lighting, for packaging materials, for protection of objects installed outdoors, for optical fiber coating, for resin glass protection, and the like.

EXAMPLES

Hereinbelow, the present invention will be described in more detail with reference to the following Examples and Comparative Examples, and, in the followings, "part(s)" and "%" are given by weight unless otherwise specified.

Synthesis Example: UA-1

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 130.14 g (1.0 mol) of 2-hydroxy-propyl acrylate was dropwise added to the resultant mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-1.

Synthesis Example: UA-2

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 38.71 g (0.33 mol) of 2-hydroxy-ethyl acrylate and 86.76 g (0.66 mol) of 2-hydroxy-propyl acrylate were dropwise added to the resultant mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-2.

Synthesis Example: UA-3

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 48.07 g (0.33 mol) of 4-hydroxy-butyl acrylate and 86.76 g (0.66 mol) of 2-hydroxy-propyl acrylate were dropwise added to the resultant mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-3.

Synthesis Example: UA-4

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 77.41 g (0.66 mol) of 2-hydroxy-ethyl acrylate and 43.38 g (0.33 mol) of 2-hydroxy-propyl acrylate were dropwise added to the resultant mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-4.

Synthesis Example: UA-5

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 158.72 g of M-305 (manufactured by Toagosei Co., Ltd.) and 86.76 g (0.66 mol) of 2-hydroxy-propyl acrylate were dropwise added to the resultant mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-5.

Synthesis Example: UA-6

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 317.4 g of M-305 (manufactured by Toagosei Co., Ltd.) and 43.38 g (0.33 mol) of 2-hydroxy-propyl acrylate were dropwise added to the resultant mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-6.

Synthesis Example: UA-7

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 158.72 g of M-305 (manufactured by Toagosei Co., Ltd.), 38.71 g (0.33 mol) of 2-hydroxy-ethyl acrylate, and 43.38 g (0.33 mol) of 2-hydroxy-propyl acrylate were dropwise added to the resultant mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-7.

Synthesis Example: UA-8

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 86.76 g (0.33 mol) of 2-hydroxy-propyl acrylate was dropwise added to the resultant mixture while stirring at a liquid temperature of 60 to 70° C. After completion of the addition, the resultant mixture was stirred at 70° C. for 2 hours. Then, 76.67 g (0.33 mol) of 2-octane-1,4-hexanediol was dropwise added to the mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-8.

Synthesis Example: UA-9

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 86.76 g (0.66 mol) of 2-hydroxy-propyl acrylate was dropwise added to the resultant mixture while stirring at a liquid temperature of 60 to 70° C. After completion of the addition, the resultant mixture was stirred at 70° C. for 2 hours. Then, 20.69 g (0.33 mol) of ethylene glycol was dropwise added to the mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-9.

Synthesis Example: UA-10

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 86.76 g (0.66 mol) of 2-hydroxy-propyl acrylate was dropwise added to the resultant mixture while stirring at a liquid temperature of 60 to 70° C. After completion of the addition, the resultant mixture was stirred at 70° C. for 2 hours. Then, 39.39 g (0.33 mol) of 1,6-hexanediol was dropwise added to the mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-10.

Synthesis Example: UA-11

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 86.76 g (0.66 mol) of 2-hydroxy-propyl acrylate was dropwise added to the resultant mixture while stirring at a liquid temperature of 60 to 70° C. After completion of the addition, the resultant mixture was stirred at 70° C. for 2 hours. Then, 30.04 g (0.33 mol) of 1,3-butanediol was dropwise added to the mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-11.

Synthesis Example: UA-12

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 86.76 g (0.66 mol) of 2-hydroxy-propyl acrylate was dropwise added to the resultant mixture while stirring at a liquid temperature of 60 to 70° C. After completion of the addition, the resultant mixture was stirred at 70° C. for 2 hours. Then, 48.73 g (0.33 mol) of 2-ethylene-1,4-hexanediol was dropwise added to the mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-12.

Synthesis Example: UA-13

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 86.76 g (0.66 mol) of 2-hydroxy-propyl acrylate was dropwise added to the resultant mixture while stirring at a liquid temperature of 60 to 70° C. After completion of the addition, the resultant mixture was stirred at 70° C. for 2 hours. Then, 53.42 g (0.33 mol) of 2-butyl-2-ethyl-1,3-propanediol was dropwise added to the mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-13.

Synthesis Example: UA-14

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 158.72 g of M-305 (manufactured by Toagosei Co., Ltd.) and 43.38 g (0.33 mol) of 2-hydroxy-propyl acrylate were dropwise added to the resultant mixture while stirring at a liquid temperature of 60 to 70° C. After completion of the addition, the resultant mixture was stirred at 70° C. for 2 hours. Then, 53.42 g (0.33 mol) of 2-butyl-2-ethyl-1,3-propanediol was dropwise added to the mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-14.

Synthesis Example: UA-15

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 116.12 g (1.0 mol) of 2-hydroxy-ethyl acrylate was dropwise added to the resultant mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-15.

Synthesis Example: UA-16

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 144.2 g (1.0 mol) of 4-hydroxy-butyl acrylate was dropwise added to the resultant mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-16.

Synthesis Example: UA-17

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 158.72 g of M-305 (manufactured by Toagosei Co., Ltd.) and 77.41 g (0.66 mol) of 2-hydroxy-ethyl acrylate were dropwise added to the resultant mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-17.

Synthesis Example: UA-18

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 77.41 g (0.66 mol) of 2-hydroxy-ethyl acrylate was dropwise added to the resultant mixture while stirring at a liquid temperature of 60 to 70° C. After completion of the addition, the resultant mixture was stirred at 70° C. for 2 hours. Then, 39.39 g (0.33 mol) of 1,6-hexanediol was dropwise added to the mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-18.

Synthesis Example: UA-19

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 77.41 g (0.66 mol) of 2-hydroxy-ethyl acrylate was dropwise added to the resultant mixture while stirring at a liquid temperature of 60 to 70° C. After completion of the addition, the resultant mixture was stirred at 70° C. for 2 hours. Then, 53.42 g (0.33 mol) of 2-butyl-2-ethyl-1,3-propanediol was dropwise added to the mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-19.

Synthesis Example: UA-20

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 158.72 g of M-305 (manufactured by Toagosei Co., Ltd.) and 38.71 g (0.33 mol) of 2-hydroxy-ethyl acrylate were dropwise added to the resultant mixture while stirring at a liquid temperature of 60 to 70° C. After completion of the addition, the resultant mixture was stirred at 70° C. for 2 hours. Then, 53.42 g (0.33 mol) of 2-butyl-2-ethyl-1,3-propanediol was dropwise added to the mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-20.

Synthesis Example: UA-21

Into a 3 L separable flask equipped with a stirrer and an air introducing pipe were charged 178.72 g (NCO 1.0 mol) of an isocyanate compound having an isocyanurate type trimer of 1,6-hexamethylene diisocyanate as a main component [DURANATE TPA-100, manufactured by Asahi Kasei Chemicals Corporation; NCO content: 23.5%], 1.8 g of 2,6-di-tert-butyl-4-methylphenol, and 0.2 g of dibutyltin dilaurate, and 86.76 g (0.66 mol) of 2-hydroxy-propyl acrylate was dropwise added to the resultant mixture while stirring at a liquid temperature of 60 to 70° C. After completion of the addition, the resultant mixture was stirred at 70° C. for 2 hours. Then, 58.09 g (0.33 mol) of 1,10-decanediol was dropwise added to the mixture while stirring at a liquid temperature of 60 to 70° C. After completion of the addition, the resultant mixture was stirred at 80° C. for 4 hours, and an IR analysis was made with respect to the reaction mixture, and the disappearance of absorption of an isocyanate group was found and then the reaction was terminated, obtaining an isocyanurate ring-containing urethane (meth)acrylate compound UA-21.

Example 1

(Preparation of a Composition)
70 parts by weight of the synthesized UA-1 and 30 parts by weight of M315 (manufactured by Toagosei Co., Ltd.; 2-hydroxy-ethyl isocyanurate triacrylate) as the compound B were blended with each other and stirred. Into the resultant blend were incorporated Tinuvin 400 (manufactured by BASF AG) as the triazine ultraviolet light absorber C in an amount of 2 parts by weight relative to the resin solids, Tinuvin 479 (manufactured by BASF AG) as the triazine ultraviolet light absorber C in an amount of 4 parts by weight relative to the resin solids, Tinuvin 123 (manufactured by BASF AG; light stabilizer) in an amount of 0.5 parts by weight relative to the resin solids, Irgcure 754 (manufactured by BASF AG; photopolymerization initiator) in an amount of 2 parts by weight relative to the resin solids, and Irgcure 819 (manufactured by BASF AG; photopolymerization initiator) in an amount of 2 parts by weight relative to the resin solids, and the resultant mixture was stirred, and then diluted with propylene glycol monomethyl ether (PGM) in an amount of 125 parts by weight relative to the resin solids and methyl ethyl ketone (MEK) in an amount of 25 parts by weight relative to the resin solids, obtaining a composition 1 having a resin solids amount of 40 parts by weight.

<Examples 2 to 27> Preparation of Compositions 2 to 23

Compositions 2 to 27 were individually obtained in the same manner as in Preparation Example 1 except that the formulation was changed to those shown in Tables 1-1 to 1-5.
(Production of a Laminate)
With respect to the obtained composition, a laminate was produced under the conditions described below using the methods shown in Tables 1-1 to 1-4. With respect to the obtained laminate, tests were conducted.
<Application>
Spray Coating
The composition 1 prepared as shown in Table 1-1 was applied to a polycarbonate plate (L-1225LZ, manufactured by Teijin Limited; thickness: 3 mm) by spray coating so that the thickness of the applied film after dried became about 1 to 20 μm, and dried in a dryer at 80° C. for 6 minutes.
Flow Coating
The composition 19 prepared as shown in Table 1-2 was applied to a polycarbonate plate (L-1225LZ, manufactured by Teijin Limited; thickness: 3 mm) by flow coating so that the thickness of the applied film after dried became about 1 to 20 μm, and dried in a dryer at 80° C. for 6 minutes.
<Curing>
In ultraviolet light irradiation, a high-pressure mercury lamp, manufactured by GS-YUASA International Ltd., was used, and the lamp output, lamp height, and conveyer speed were controlled so that, in the UV-A region of UV POWER PUCK II, manufactured by EIT LLC, the peak illuminance became 200 mW/cm² and the irradiation energy per one pass became 1,000 mJ/cm², and irradiation was conducted with one pass (total: 1,000 mJ/cm$^2$) or two passes (total: 2,000 mJ/cm$^2$) to cause a curing reaction, obtaining a laminate.

<Evaluation>

[Taber Abrasion Resistance Test]

In a Taber abrasion resistance teste, the surface of a laminate was abraded by the method in accordance with ASTM D1044 (abrasive wheel: CS-10F; load: 500 g; number of revolutions: 100), and a difference in the haze value between the surface in the initial state and the abraded surface, i.e., a change of the haze value ΔH (%) was measured. The smaller the difference, the higher the abrasion resistance, and an acceptable value was the following: ΔHaze 15.0.

[Haze Value]

Using a haze meter, a light transmittance of a test specimen was measured, and a haze value was determined according to the following formula (unit: %).

$$Th = Td/Tt \quad [\text{Math. 1}]$$

(where Td is a scattered light transmittance, and Tt is a total light transmittance)

[Test for Resistance to Boiling Water]

Bleed Resistance

Warm water at 100° C. in a temperature controlled water bath (T-104NA, manufactured by Thomas Kagaku Co., Ltd.) was prepared, and the obtained laminate was immersed in the water for 3 hours and taken out of the water, and then the temperature of the above-mentioned each sample was cooled to room temperature, and a change of the surface layer of the laminate was visually examined. A sample which could not be wiped using an organic solvent, such as IPA, was judged to have whitening caused in the film itself.

⊚: No whitening was caused.

◯: Slight whitening was caused.

x: Distinct whitening was caused.

Adhesion

Warm water at 100° C. in a temperature controlled water bath (T-104NA, manufactured by Thomas Kagaku Co., Ltd.) was prepared, and the obtained laminate was immersed in the water for 3 hours and taken out of the water, and then the temperature of the above-mentioned each sample was cooled to room temperature, and a cellophane adhesive tape was put on around the center portion of the laminate after tested and the tape was quickly peeled off the laminate, and the adhesion to the polycarbonate plate was evaluated in accordance with the following criteria.

◯: No peeling was caused.

x: Peeling was caused.

[SUV Accelerated Weathering Test]

Using super accelerated weathering tester Super UV Tester (SUV), manufactured by Iwasaki Electric Co., Ltd., a test was conducted in which one cycle took 12 hours, that is, a cycle of irradiation for 4 hours (irradiation intensity: 90 mW; black panel temperature: 63° C.; humidity: 70%), blackout for 4 hours (black panel temperature: 63° C.; humidity: 90%), and condensation for 4 hours (black panel temperature: 30° C.; humidity: 95%) was one cycle, and evaluations were made every 100 hours.

(Whitening)

Using a haze meter, a light transmittance of a test specimen was measured, and a change of the Haze value, i.e., a ΔHaze was determined according to the Math. 1.

◯: ΔHaze<5.0 x: ΔHaze≥5.0

(Yellowing)

Using a color difference meter, a color tone of a test specimen was measured, and a change of the yellow index YI value, i.e., a ΔYI was determined.

◯: ΔYI<5.0 x: ΔYI≥5.0

(Crack)

◯: No crack is formed in the surface.

x: A crack is formed in the surface.

(Adhesion)

With respect to the laminate, a time at which peeling naturally occurred at the end potion of the laminate during the test was checked, and the adhesion to the polycarbonate plate was evaluated in accordance with the following criteria.

◯: No peeling was found.

x: Peeling was found.

TABLE 1-1

|  |  | Example 1 | Example 2 | Example 3 | Example 4 | Example 5 | Example 6 |
|---|---|---|---|---|---|---|---|
| Isocyanurate ring-containing urethane (meth)acrylate A | UA-1 | 70 | | | | | |
|  | UA-2 | | 70 | | | | |
|  | UA-3 | | | 70 | | | |
|  | UA-4 | | | | 70 | | |
|  | UA-5 | | | | | 70 | |
|  | UA-6 | | | | | | 70 |
| Isocyanurate ring-containing tri(meth)acrylate B | M315 | 30 | 30 | 30 | 30 | 30 | 30 |
| Triazine | Tinuvin400 | 2 | 2 | 2 | 2 | 2 | 2 |
| UV light absorber C | Tinuvin479 | 4 | 4 | 4 | 4 | 4 | 4 |
| Reactive UV light absorber | Ruva93 | | | | | | |
| Light stabilizer | Tinuvin123 | 0.5 | 0.5 | 0.5 | 0.5 | 0.5 | 0.5 |
| Silica fine particles | PGM-ST | | | | | | |
|  | MIBK-SD | | | | | | |
| Photopolymerization initiator | Igracure754 | 2 | 2 | 2 | 2 | 2 | 2 |
|  | Igracure819 | 2 | 2 | 2 | 2 | 2 | 2 |
| Solvent | PGM | 125 | 125 | 125 | 125 | 125 | 125 |
|  | MEK | 25 | 25 | 25 | 25 | 25 | 25 |
| Thickness (μm) |  | 20 | 20 | 20 | 20 | 20 | 20 |

TABLE 1-1-continued

|  |  | Example 1 | Example 2 | Example 3 | Example 4 | Example 5 | Example 6 |
|---|---|---|---|---|---|---|---|
| Coating method |  | Spray | Spray | Spray | Spray | Spray | Spray |
| Drying conditions |  | 80° C.6 min | 80° C.6 min | 80° C.6 min | 80° C.6 min | 80° C.6 min | 80° C.6 min |
| UV Conditions | UV illuminance (mW/cm2) | 200 | 200 | 200 | 200 | 200 | 200 |
|  | UV quantity of light (mJ/cm2) | 1000 | 1000 | 1000 | 1000 | 1000 | 1000 |
| Taber abrasion resistance (500 g 100 revolutions) | ∆ Haze | 10.1 | 8.5 | 12.6 | 8.1 | 7.5 | 5.2 |
| Test for resistance to boiling water | Bleed resistance | ○ | ○ | ○ | ○ | ◎ | ◎ |
|  | Adhesion | ○ | ○ | ○ | ○ | ○ | ○ |
| SUV Accelerated weathering test | Whitening (∆ Haze ≥ 5.0) | >800 h○ | >800 h○ | >800 h○ | >800 h○ | >800 h○ | >800 h○ |
|  | Yellowing (∆ $Y_i$ ≥ 5.0) | 700 hX | 700 hX | 700 hX | 700 hX | >800 h○ | >800 h○ |
|  | Crack | >800 h○ | >800 h○ | >800 h○ | >800 h○ | 700 hX | 700 hX |
|  | Adhesion | 700 hX | 700 hX | 700 hX | 700 hX | >800 h○ | >800 h○ |

TABLE 1-2

|  |  | Example 7 | Example 8 | Example 9 | Example 10 | Example 11 | Example 12 |
|---|---|---|---|---|---|---|---|
| Isocyanurate ring-containing urethane (meth)acrylate A | UA-7 | 70 |  |  |  |  |  |
|  | UA-9 |  | 70 |  |  |  |  |
|  | UA-10 |  |  | 70 |  |  |  |
|  | UA-11 |  |  |  | 70 |  |  |
|  | UA-12 |  |  |  |  | 70 |  |
|  | UA-13 |  |  |  |  |  | 70 |
| Isocyanate ring-containing tri(meth)acrylate B | M315 | 30 | 30 | 30 | 30 | 30 | 30 |
| Triazine UV light absorber C | Tinuvin400 | 2 | 2 | 2 | 2 | 2 | 2 |
|  | Tinuvin479 | 4 | 4 | 4 | 4 | 4 | 4 |
| Reactive UV light absorber | Ruva93 |  |  |  |  |  |  |
| Light stabilizer | Tinuvin123 | 0.5 | 0.5 | 0.5 | 0.5 | 0.5 | 0.5 |
| Silica fine particles | PGM-ST |  |  |  |  |  |  |
|  | MIBK-SD |  |  |  |  |  |  |
| Photopolymerization initiator | Irgacure754 | 2 | 2 | 2 | 2 | 2 | 2 |
|  | Irgacure819 | 2 | 2 | 2 | 2 | 2 | 2 |
| Solvent | PGM | 125 | 125 | 125 | 125 | 125 | 125 |
|  | MEK | 25 | 25 | 25 | 25 | 25 | 25 |
| Thickness (μm) |  | 20 | 20 | 20 | 20 | 20 | 20 |
| Coating method |  | Spray | Spray | Spray | Spray | Spray | Spray |
| Drying conditions |  | 80° C. 6 min | 80° C. 6 min | 80° C. 6 min | 80° C. 6 min | 80° C. 6 min | 80° C. 6 min |
| UV Conditions | UV illuminance (mW/cm2) | 200 | 200 | 200 | 200 | 200 | 200 |
|  | UV quantity of light (mJ/cm2) | 1000 | 1000 | 1000 | 1000 | 1000 | 1000 |
| Taber abrasion resistance (500 g, 100 revolutions) | ∆ Haze | 6.3 | 8.4 | 10.5 | 9.1 | 9 | 9.5 |
| Test for resistance to boiling water | Bleed resistance | ◎ | ◎ | ◎ | ◎ | ◎ | ◎ |
|  | Adhesion | ○ | ○ | ○ | ○ | ○ | ○ |
| SUV Accelerated weathering test | Whitening ∆ Haze ≥ 5.0) | >800 h○ | >800 h○ | >800 h○ | >800 h○ | >800 h○ | >800 h○ |
|  | Yellowing ∆ $Y_i$ ≥ 5.0) | >800 h○ | 800 hX | 800 hX | >800 h○ | >800 h○ | >800 h○ |
|  | Crack | 700 hX | >800 h○ | >800 h○ | >800 h○ | >800 h○ | >800 h○ |
|  | Adhesion | >800 h○ | >800 h○ | >800 h○ | >800 h○ | >800 h○ | >800 h○ |

TABLE 1-3

|  |  | Example 13 | Example 14 | Example 15 | Example 16 | Example 17 | Example 18 |
|---|---|---|---|---|---|---|---|
| Isocyanurate ring-containing urethane (meth)acrylate A | UA-11 |  | 20 | 30 | 80 | 70 | 70 |
|  | UA-14 | 70 |  |  |  |  |  |
| Isocyanurate ring-containing tri(meth)acrylate B | M315 | 30 | 80 | 70 | 20 | 30 | 30 |
| Triazine | Tinuvin400 | 2 | 2 | 2 | 2 | 1 | 3 |
| UV light absorber C | Tinuvin479 | 4 | 4 | 4 | 4 | 2 | 6 |
| Reactive UV light absorber | Ruva93 |  |  |  |  |  |  |
| Light stabilizer | Tinuvin123 | 0.5 | 0.5 | 0.5 | 0.5 | 0.5 | 0.5 |
| Silica fine particles | PGM-ST |  |  |  |  |  |  |
|  | MIBK-SD |  |  |  |  |  |  |
| Photopolymerization initiator | Irgacure754 | 2 | 2 | 2 | 2 | 2 | 2 |
|  | Irgacure819 | 2 | 2 | 2 | 2 | 2 | 2 |
| Solvent | PGM | 125 | 125 | 125 | 125 | 125 | 125 |
|  | MEK | 25 | 25 | 25 | 25 | 25 | 25 |
| Thickness (μm) |  | 20 | 20 | 20 | 20 | 20 | 20 |
| Coating method |  | Spray | Spray | Spray | Spray | Spray | Spray |
| Drying conditions |  | 80° C.6 min | 80° C.4 min | 80° C.4 min | 80° C.8 min | 80° C.6 min | 80° C.6 min |
| UV Conditions | UV illuminance (mW/cm2) | 280 | 200 | 200 | 200 | 200 | 200 |
|  | UV quantity of light (mJ/cm2) | 1000 | 1000 | 1000 | 1000 | 1000 | 1000 |
| Taber abrasion resistance (500 g, 100 revolutions) | $\Delta$Haze | 9.5 | 6.1 | 6.2 | 10.1 | 7.2 | 10.6 |
| Test for resistance to boiling water | Bleed resistance | ◎ | ◎ | ◎ | ◎ | ◎ | ◎ |
|  | Adhesion | ○ | ○ | ○ | ○ | ○ | ○ |
| SUV Accelerated weathering test | Whitening ($\Delta$ Haze ≥ 5.0) | >800 h○ | >800 h○ | >800 h○ | >800 h○ | >800 h○ | >800 h○ |
|  | Yellowing ($\Delta Y_i$ ≥ 5.0) | >800 h○ | >800 h○ | >800 h○ | >800 h○ | 700 hx | >800 h○ |
|  | Crack | >800 h○ | 700 hX | >800 h○ | >800 h○ | >800 h○ | >800 h○ |
|  | Adhesion | >800 h○ | >800 h○ | >800 h○ | 700 hX | 700 hX | >800 h○ |

TABLE 1-4

|  |  | Example 19 | Example 20 | Example 21 | Example 22 | Example 23 |
|---|---|---|---|---|---|---|
| Isocyanurate ring-containing urethane (meth)acrylate A | UA-5 |  | 35 |  |  |  |
|  | UA-11 | 70 |  |  | 70 | 70 |
|  | UA-12 |  |  |  |  |  |
|  | UA-13 |  | 35 | 35 |  |  |
|  | UA-14 |  |  | 35 |  |  |
| Isocyanurate ring-containing tri(meth)acrylate B | M315 | 30 | 30 | 30 | 30 | 30 |
| Triazine | Tinuvin400 |  | 2 | 2 | 2 | 2 |
| UV light absorber C | Tinuvin479 | 4 | 4 | 4 | 4 | 4 |
| Reactive UV light absorber | Ruva93 | 4 |  |  |  |  |
| Light stabilizer | Tinuvin123 | 0.5 | 0.5 | 0.5 | 0.5 | 0.5 |
| Silica fine particles | PGM-ST |  |  |  | 10 |  |
|  | MIBK-SD |  |  |  |  | 10 |
| Photopolymerization initiator | Irgacure754 | 2 | 2 | 2 | 2 | 2 |
|  | Irgacure819 | 2 | 2 | 2 | 2 | 2 |
| Solvent | PGM | 125 | 125 | 125 | 125 | 125 |
|  | MEK | 25 | 25 | 25 | 25 | 25 |
| Thickness (μm) |  | 20 | 20 | 20 | 20 | 20 |
| Coating method |  | Flow | Spray | Spray | Flow | Spray |
| Drying conditions |  | 80° C.6 min | 80° C.6 min | 80° C.6 min | 80° C.6 min | 80° C.6 min |
| UV Conditions | UV illuminance (mW/cm2) | 200 | 200 | 200 | 200 | 200 |
|  | UV quantity of light (mJ/cm2) | 2000 | 1000 | 1000 | 1000 | 1000 |

TABLE 1-4-continued

|  |  | Example 19 | Example 20 | Example 21 | Example 22 | Example 23 |
|---|---|---|---|---|---|---|
| Taber abrasion resistance (500 g, 100 revolutions) | ⊿ Haze | 8.6 | 7.1 | 7.1 | 3.1 | 2.4 |
| Test for resistance to boiling water | Bleed resistance | ◎ | ◎ | ◎ | ◎ | ◎ |
|  | Adhesion | ○ | ○ | ○ | ○ | ○ |
| SUV Accelerated weathering test | Whitening (⊿ Haze ≥ 5.0) | >800 h○ | >800 h○ | >800 h○ | >800 h○ | >800 h○ |
|  | Yellowing (⊿ $Y_i$ ≥ 5.0) | >800 h○ | >800 h○ | >800 h○ | >800 h○ | >800 h○ |
|  | Crack | >800 h○ | >800 h○ | >800 h○ | >800 h○ | >800 h○ |
|  | Adhesion | >800 h○ | >800 h○ | >800 h○ | >800 h○ | >800 h○ |

TABLE 1-5

|  |  | Example 24 | Example 25 | Example 25 | Example 27 |
|---|---|---|---|---|---|
| Isocyanurate ring-containing urethane (meth)acrylate A | UA-11 | 10 | 90 | 70 | 70 |
| Isocyanurate ring-containing tri(meth)acrylate B | M315 | 90 | 10 | 30 | 30 |
| Triazine | Tinuvin400 | 2 | 2 |  | 5 |
| UV light absorber C | Tinuvin479 | 4 | 4 | 2 | 8 |
| Reactive UV light absorber | Ruva93 |  |  |  |  |
| Light stabilizer | Tinuvin123 | 0.5 | 0.5 | 0.5 | 0.5 |
| Silica fine particles | PGM-ST |  |  |  |  |
|  | MIBK-SD |  |  |  |  |
| Photopolymerization initiator | Irgacure754 | 2 | 2 | 2 | 2 |
|  | Irgacure819 | 2 | 2 | 2 | 2 |
| Solvent | PGM | 125 | 125 | 125 | 125 |
|  | MEK | 25 | 25 | 25 | 25 |
| Thickness (μm) |  | 20 | 20 | 20 | 20 |
| Coating method |  | Spray | Spray | Spray | Spray |
| Drying conditions |  | 80° C.4 min | 80° C.8 min | 80° C.6 min | 80° C.6 min |
| UV Conditions | UV illuminance (mW/cm2) | 200 | 200 | 200 | 200 |
|  | UV quantity of light (mJ/cm2) | 1000 | 1000 | 1000 | 1000 |
| Taber abrasion resistance (500 g, 100 revolutions) | ⊿ Haze | 5.5 | 11.6 | 6.7 | 14.7 |
| Test for resistance to boiling water | Bleed resistance | ◎ | ◎ | ◎ | ◎ |
|  | Adhesion | ○ | ○ | ○ | ○ |
| SUV Accelerated weathering test | Whitening (⊿ Haze ≥ 5.0) | >800 h○ | >800 h○ | >800 h○ | >800 h○ |
|  | Yellowing (⊿ $Y_i$ ≥ 5.0) | >800 h○ | >800 h○ | 400 hX | >800 h○ |
|  | Crack | 600 hX | >800 h○ | >800 h○ | >800 h○ |
|  | Adhesion | >800 h○ | 400 hX | 400 hX | 600 hX |

Ruva 93: manufactured by Otsuka Chemical Co., Ltd.; Methacryloyl group-containing benzotriazole ultraviolet light absorber Silica-1: PGM-ST (manufactured by Nissan Chemical Industries, Ltd.) Unmodified silica (dispersed particle diameter: 50 nm)

Silica-2: MIBK-SD (manufactured by Nissan Chemical Industries, Ltd.) Methacryloyl-modified silica (dispersed particle diameter: 50 nm)

<Comparative Examples 1 to 8> Preparation of Comparative Compositions 1 to 8

Comparative compositions 1 to 8 and laminates 1 to 8 were individually obtained in the same manner as in Example 1 except that the formulation was changed to those shown in Tables 2-1 and 2-2, and evaluations of them were conducted.

TABLE 2-1

|  |  | Comparative Example 1 | Comparative Example 2 | Comparative Example 3 | Comparative Example 4 |
|---|---|---|---|---|---|
| Isocyanurate ring-containing urethane (meth)acrylate A | UA-15 | 70 | | | |
| | UA-16 | | 70 | | |
| | UA-17 | | | 70 | |
| | UA-18 | | | | 70 |
| Isocyanurate ring-containing tri(meth)acrylate B | M315 | 30 | 30 | 30 | 30 |
| Triazine | Tinuvin400 | 2 | 2 | 2 | 2 |
| UV light absorber C | Tinuvin479 | 4 | 4 | 4 | 4 |
| Reactive UV light absorber | Ruva93 | | | | |
| Light stabilizer | Tinuvin123 | 0.5 | 0.5 | 0.5 | 0.5 |
| Silica fine particles | PGM-ST | | | | |
| | MIBK-SD | | | | |
| Photopolymerization initiator | Irgacure754 | 2 | 2 | 2 | 2 |
| | Irgacure819 | 2 | 2 | 2 | 2 |
| Solvent | PGM | 125 | 125 | 125 | 125 |
| | MEK | 25 | 25 | 25 | 25 |
| Thickness (μm) | | 20 | 20 | 20 | 20 |
| Coating method | | Spray | Spray | Spray | Spray |
| Drying conditions | | 80° C.6 min | 80° C.6 min | 80° C.6 min | 80° C.6 min |
| UV Conditions | UV illuminance (mW/cm2) | 200 | 200 | 200 | 200 |
| | UV quantity of light (mJ/cm2) | 1000 | 1000 | 1000 | 1000 |
| Taber abrasion resistance (500 g, 100 revolutions) | $\Delta$ Haze | 7.4 | 13.5 | 6.3 | 10.1 |
| Test for resistance to boiling water | Bleed resistance | X | X | X | X |
| | Adhesion | X | X | X | X |
| SUV Accelerated weathering test | Whitening ($\Delta$ Haze ≥ 5.0) | 200 hX | >800 hX | 200 hX | 300 hX |
| | Yellowing ($\Delta$ $Y_i$ ≥ 5.0) | 200 hX | 600 hX | 200 hX | 300 hX |
| | Crack | >800 h○ | >800 h○ | 600 hX | >800 h○ |
| | Adhesion | 200 hX | 600 hX | 200 hX | 300 hX |

TABLE 2-2

|  |  | Comparative Example 5 | Comparative Example 6 | Comparative Example 7 | Comparative Example 8 |
|---|---|---|---|---|---|
| Isocyanurate ring-containing urethane (meth)acrylate A | UA-19 | | | 70 | |
| | UA-20 | | | | 70 |
| | UA-8 | | 70 | | |
| | UA-21 | 70 | | | |
| Isocyanurate ring-containing tri(meth)acrylate B | M315 | 30 | 30 | 30 | 30 |
| Triazine | Tinuvin400 | 2 | 2 | 2 | 2 |
| UV light absorber C | Tinuvin479 | 4 | 4 | 4 | 4 |
| Reactive UV light absorber | Ruva93 | | | | |
| Light stabilizer | Tinuvin123 | 0.5 | 0.5 | 0.5 | 0.5 |
| Silica fine particles | PGM-ST | | | | |
| | MIBK-SD | | | | |
| Photopolymerization initiator | Irgacure754 | 2 | 2 | 2 | 2 |
| | Irgacure819 | 2 | 2 | 2 | 2 |
| Solvent | PGM | 125 | 125 | 125 | 125 |
| | MEK | 25 | 25 | 25 | 25 |
| Thickness (μm) | | 20 | 20 | 20 | 20 |
| Coating method | | Spray | Spray | Spray | Spray |
| Drying conditions | | 80° C.6 min | 80° C.6 min | 80° C.6 min | 80° C.6 min |
| UV Conditions | UV illuminance (mW/cm2) | 200 | 200 | 200 | 200 |
| | UV quantity of light (mJ/cm2) | 1000 | 1000 | 1000 | 1000 |
| Taber abrasion resistance (500 g, 100 revolutions) | $\Delta$ Haze | 15.1 | 12.4 | 10.4 | 9.9 |

TABLE 2-2-continued

| | | Comparative Example 5 | Comparative Example 6 | Comparative Example 7 | Comparative Example 8 |
|---|---|---|---|---|---|
| Test for resistance to boiling water | Bleed residence | X | ○ | X | X |
| | Adhesion | X | X | X | X |
| SUV Accelerated weathering test | Whitening (Δ Haze ≥ 5.0) | >800 h○ | >800 h○ | 400 hX | 400 hX |
| | Yellowing (Δ $Y_i$ ≥ 5.0) | 600 hX | >800 h○ | 400 hX | 400 hX |
| | Crack | >800 h○ | 600 hX | >800 h○ | 400 hX |
| | Adhesion | 600 hX | 600 hX | 400 hX | 400 hX |

INDUSTRIAL APPLICABILITY

The composition of the present invention is advantageous in that a cured product having excellent abrasion resistance and excellent weathering resistance, particularly long-term weathering resistance, can be obtained from the composition, and therefore a molded article having excellent hard coat properties can be produced from the composition. The composition of the present invention also has excellent adhesion to a substrate, particularly a plastic substrate, and therefore can be advantageously used as a coating agent for a plastic. Particularly, the composition can be advantageously used as a hard coat in outdoor applications.

The invention claimed is:

1. A resin composition comprising an isocyanurate ring-containing urethane (meth)acrylate compound A, an isocyanurate ring-containing tri(meth)acrylate compound B, and a triazine ultraviolet light absorber C,
wherein the isocyanurate ring-containing urethane (meth)acrylate compound A contains a compound A-1 represented by the formula (1), and the isocyanurate ring-containing tri(meth)acrylate compound B contains a compound B-1 represented by the formula (2):

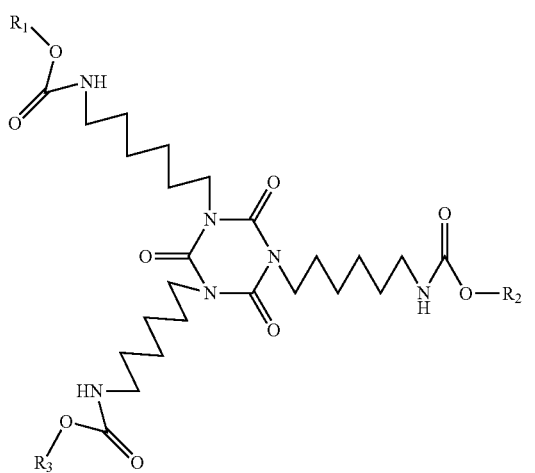

(1)

wherein, in the formula (1), each of $R_1$, $R_2$, and $R_3$ independently represents a group represented by the formula (1-a) or formula (1-b):

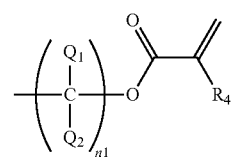

(1-a)

wherein, in the formula (1-a), n1 represents an integer of 2 to 4, $R_4$ represents a hydrogen atom or a methyl group, and each of $Q_1$ and $Q_2$ independently represents a hydrogen atom or an alkyl group having 1 to 5 carbon atoms in the repeating unit, and at least one of $Q_1$ and $Q_2$ is an alkyl group,

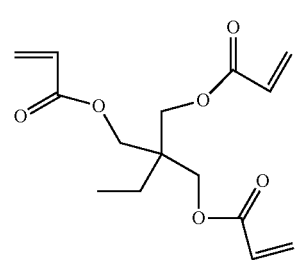

(1-b)

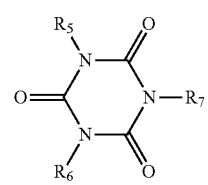

(2)

wherein, in the formula (2), each of $R_5$, $R_6$, and $R_7$ independently represents a group represented by the following formula (2-a):

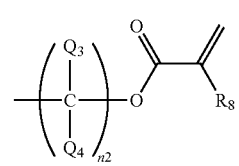

(2-a)

wherein, in the formula (2-a), n2 represents an integer of 2 to 4, $R_8$ represents a hydrogen atom or a methyl group, and each of $Q_3$ and $Q_4$ independently represents a hydrogen atom or an alkyl group having 1 to 5 carbon atoms in the repeating unit, wherein the isocyanurate ring-containing urethane (meth)acrylate compound A further contains a compound A-2 represented by the following formula (3):

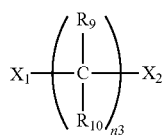
(3)

wherein, in the formula (3), n3 represents an integer of 2 to 9, each of $R_9$ and $R_{10}$ independently represents a hydrogen atom or an alkyl group having 1 to 7 carbon atoms in the repeating unit, and each of $X_1$ and $X_2$ independently represents a group represented by the following formula (3-a):

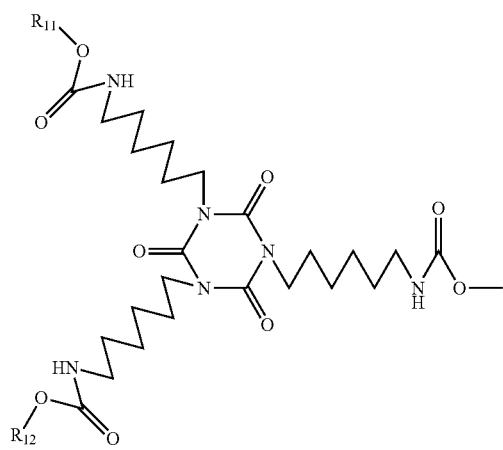
(3-a)

wherein, in the formula (3-a), each of $R_{11}$ and $R_{12}$ independently represents a group represented by the formula (1-a) or formula (1-b) above.

2. The resin composition according to claim 1, wherein the isocyanurate ring-containing urethane (meth)acrylate compound A has at least one structure represented by the formula (1-b).

3. The resin composition according to claim 1, further comprising a filler.

4. A cured product which is obtained by curing the resin composition according to claim 1.

5. A laminate which is obtained by laminating a substrate and a layer of the cured product according to claim 4 on one another.

6. The resin composition according to claim 1, which is a weathering-resistant coating composition.

7. The resin composition according to claim 2, further comprising a filler.

8. A cured product which is obtained by curing the resin composition according to claim 2.

9. A cured product which is obtained by curing the resin composition according to claim 3.

10. A laminate which is obtained by laminating a substrate and a layer of the cured product according to claim 8 on one another.

11. A laminate which is obtained by laminating a substrate and a layer of the cured product according to claim 9 on one another.

12. The resin composition according to claim 2, which is a weathering-resistant coating composition.

13. The resin composition according to claim 3, which is a weathering-resistant coating composition.

* * * * *